(12) United States Patent
Florexil

(10) Patent No.: US 12,151,517 B2
(45) Date of Patent: Nov. 26, 2024

(54) PNEUMATIC TIRE HAVING A LEAK RESISTANT BLADDER

(71) Applicant: Wagner Florexil, Riverview,, FL (US)

(72) Inventor: Wagner Florexil, Riverview,, FL (US)

( * ) Notice: Subject to any disclaimer, the term of this patent is extended or adjusted under 35 U.S.C. 154(b) by 0 days.

(21) Appl. No.: 18/295,814

(22) Filed: Apr. 4, 2023

(65) Prior Publication Data
US 2024/0336093 A1 Oct. 10, 2024

(51) Int. Cl.
*B60C 19/12* (2006.01)
(52) U.S. Cl.
CPC ................. *B60C 19/122* (2013.01)
(58) Field of Classification Search
CPC ............... B60C 19/12; B60C 19/122
See application file for complete search history.

(56) References Cited

U.S. PATENT DOCUMENTS

| | | | | |
|---|---|---|---|---|
| 6,739,365 | B1 * | 5/2004 | Makino | B29C 73/20 |
| | | | | 152/196 |
| 2009/0266464 | A1 * | 10/2009 | Boulain | B60C 19/12 |
| | | | | 152/505 |

* cited by examiner

*Primary Examiner* — Kendra Ly
(74) *Attorney, Agent, or Firm* — Inventions International Inc.; Tiffany C. Miller

(57) ABSTRACT

A pneumatic tire having a leak resistant bladder. The tire having an outer wall surface and an inner wall surface. The tire having an expandable first sidewall and an expandable second sidewall. A tread portion is located on at least a portion of the outer wall surface of the tire. A first bead having a first bead wire is connected to a first sidewall of the tire. A second bead having a second bead wire is connected to a second sidewall of the tire. The first bead and the second bead are connected to a rim. The tire has an internal expandable bladder configured to retain compressed gas. A barrier element is located between the inner wall surface of the tire and a substance layer. The substance layer is located between an inner wall surface of the barrier element and an outer wall surface of the internal expandable bladder.

11 Claims, 12 Drawing Sheets

PNEUMATIC TIRE HAVING A LEAK RESISTANT BLADDER

BACKGROUND OF THE INVENTION

1. Field of the Invention

This invention relates, generally, to a pneumatic tire and, more particularly, to a pneumatic tire having a leak resistant bladder. Specifically, the present invention relates to a pneumatic tire having a substance layer located between a barrier layer and an expandable internal bladder.

2. Background Art

It is desired in the art to improve the safety and steering response of vehicles due to tire failure. Many vehicle manufacturers in today's market have removed the spare tire in an attempt to decrease weight, increase fuel efficiency, and provide additional cargo space of a vehicle. In the event of tire failure including, but not limited to, a puncture, it is currently known to use an emergency tire repair kit or to have the vehicle equipped with run-flat tires. Through the years, run-flat technology has evolved and is more common on many vehicles. Some run-flat pneumatic tires in today's market are currently known to have reinforced sidewalls that are resistant to the effects of deflation when punctured by a blunt object. In particular, run-flat technology is self-supporting and does not require air pressure to maintain the shape of a tire and does not require air pressure to maintain a tire's functionality of supporting the weight of a vehicle. Thus, run-flat technology permits a vehicle having a tire puncture to proceed being driven at a reduced speed for a given length of time.

Numerous types of such reinforced pneumatic tires are known in the art. For example, U.S. Pat. No. 11,040,580 to The Yokohama Rubber Co., LTD teaches a pneumatic tire having a sidewall with a side reinforcing layer, a filler layer, and a carcass layer retaining a bead core having the shape of a radially outward side wedge shape. In yet another example, Bridgestone Corporation of U.S. Pat. No. 10,195,911 teaches a run-flat tire having a pair of bead cores, a carcass positioned between the pair of bead cores and having end portion sides anchored to the bead cores, and side reinforcing rubber located at a tire side portion having a decreases thickness on progression toward a bead core side and toward a tread portion side.

In another example, U.S. Pat. No. 10,882,364 to Bridgestone Americas Tire Operations, LLC discloses a tire having a central axis, a radius, and a circumferential tread having a convex cross-section. The pair of sidewalls of the tire extend from opposite sides of the circumferential tread. The sidewalls of the tire have a concave cross-section that is defined by a radius that is greater in size than the maximum radius of the convex cross-section of the circumferential tread. In another example, U.S. Pat. No. 10,688,835 to Sumitomo Rubber Industries, Ltd. teaches a run-flat tire having a tread portion, sidewall portions, a bead portion, and a carcass ply extending between the bead portions. In particular, the sidewall portions have a reinforcing rubber layer with a crescent shaped cross sectional disposed at a location that is axially inside of the carcass ply. In yet another example, The Yokohama Rubber Co., LTD discloses in U.S. Pat. No. 9,884,521, a run-flat tire having an annular tread portion extending in a tire circumferential direction. A pair of sidewall portions are arranged on both sides of the tread portion with a side reinforcing layer in a falcated cross-sectional shape being arranged between the carcass layer and an inner liner layer in the sidewall portion. In yet another example, U.S. Pat. No. 9,849,735 to Toyo Tire & Rubber Co., LTD. teaches a run-flat tire having a sidewall part reinforced by a side reinforcing rubber part formed by a rubber composition which comprises 100 parts by mass of a diene rubber containing natural rubber and polybutadiene rubber, and from 0.1 to 4.0 parts by mass of a mercaptobenzimidazole compound.

Some run-flat tires teach an insert disclosed for installation in a pneumatic tire mounted on a rim of a wheel. The insert is in the form of a toroidal member made from expanded polymer foam beads which are molded into a structural foam part. The run-flat tire insert has an inner diameter surface sized to fit about a periphery of a wheel rim and an outer diameter sized to fit within a tire cavity spaced from an inner casing surface of the tire as taught by Richard W. Roberts and John E. Nemazi in U.S. Pat. No. 10,821,786.

Other pneumatic tires, such as those discussed in U.S. Pat. No. 10,195,911 to Sumitomo Rubber Industries, LTD. disclose a pneumatic tire having a set of ring-shaped beads and a carcass extending through and between a first bead and a second bead. Each bead includes a core and an apex extending from the core outward in a radial direction. The core has a main body with a cord extending in a circumferential direction as well as a stretchable portion formed from a crosslinked rubber. The stretchable portion of the core is located inward of the main body in an axial direction. Further, the stretchable portion of the core has a size with which at least one cross-section of the cord can be included in a cross-section of the bead.

One problem common to each of these run-flat pneumatic tires is the problem of user discomfort as the ride quality within a vehicle is reduced due to the stiffer sidewalls of an existing run-flat tire compared to that of a non-run-flat tire. Another problem with current run-flat technology is the increased road noise generated and emitted through to the inside of a vehicle. A third problem with today's run-flat tire technology is that repairing a punctured run-flat tire is often not a viable option after the tire has been driven on without air for the recommended period of time due to damage to the toroidal carcass. Further, a fourth problem experienced with run-flat tires in today's market is the increased cost associated with the complex manufacturing process. Finally, the fifth problem commonly known with run-flat pneumatic tires is the lack of availability of some specific sizes and tread options.

Thus, there is a need for an improved pneumatic tire having an expandable bladder with an elastic, and/or expandable gusset, and/or accordion type structure configured to expand when receiving a nail or other sharp object, thereby, eliminating the need for a toroidal carcass for providing reinforced sidewalls of current run-flat tire technology. Previously discussed pneumatic tires having a bead core with a stretchable portion are known. However, the bead core known in the art is a length of cord material extending in a circumferential direction that is capable of being stretched and is a completely different structural feature than an accordion or gusset type expandable bladder of a tire.

However, in view of the prior art considered as a whole at the time the present invention was made; it was not obvious to those of ordinary skill in the pertinent art how the identified needs could be fulfilled.

SUMMARY OF THE INVENTION

The long-standing but heretofore unfulfilled need for a pneumatic tire having a leak resistant bladder and which also includes improvements that overcome the limitations of prior pneumatic tires, is now met by a new, useful, and non-obvious invention.

In a first embodiment, the novel expandable pneumatic tire has a leak resistant bladder. The tire has an outer wall surface and an inner wall surface. The tire has a first sidewall opposing a second sidewall. The first sidewall of the tire has a first resilient structure. It is within the scope of this invention for the novel expandable pneumatic tire to have an integrally formed portion in which at least one or more of the inner layers of the tire are fused anywhere between the bead portions and the sidewalls of the tire, yet remain unfused with the rest of the tire to allow an increase in movement and an increase in elasticity. It is within the scope of this invention for the resilient structure to include, but not be limited to, any expandable material, an elastic material, an accordion gusset, a spring, and/or a plurality of overlapping folds. The second sidewall of the tire has a second resilient structure. The first resilient structure of the first sidewall of the tire is located parallel to the second resilient structure of the second sidewall of the tire. The first resilient structure of the first sidewall of the tire and the second resilient structure of the second sidewall of the tire are oriented on a substantially horizontal configuration, whereby, the first resilient structure of the first sidewall of the tire and the second resilient structure of the second sidewall of the tire are configured to compress along the x-axis when the force of an object punctures the tire. This compression along the x-axis allows excess material under the tire tread portion, along with the possibility of adding a slippery substance to facilitate the sliding movement between layers, to have the flexibility to facilitate the material gathering around a nail, for example, and the material conforming around the perimeter of the nail rather than allowing the nail to pierce through the internal bladder retaining compressed air.

In particular, when the force of an object, such as, a blunt object, a nail, a screw, or a piece of debris attempts to puncture through the tire layer of the novel expandable pneumatic tire, the sidewalls of the tire are capable of expanding and/or compressing without tearing or breaking due to the elastic and stretchable structural configuration of at least one resilient structure. In particular, as the compression of the at least one of the resilient structures of the tire occurs during an attempted tire puncture, excess material of the tire, at the tread area and/or shoulder area of the tire, will conform to the outer perimeter edge of the puncturing object. The puncturing object may include, but not be limited to, a nail. The excess material of the tire at the tread area and/or shoulder area, along with the possible addition of at least one slippery layer, forms an impenetrable barrier to prevent an actual puncture of the internal bladder retaining compressed air. Thus, preventing a leak from compressed gas retained within the tire being expelled through a potential puncture. The tire has a tread portion located on at least a portion of an outer wall surface of the tire. A first bead has a first bead wire connected to the first sidewall of the tire. A second bead has a second bead wire connected to the second sidewall of the tire. The first bead and the second bead are configured to connect to a vehicle rim.

In a second embodiment, any tire, including, but not limited to, the aforementioned novel expandable pneumatic tire of the first embodiment, a standard pneumatic tire, and/or a run-flat tire, may have an additional layer of protection, such as a novel expandable bladder configured to prevent compressed air leaks associated with a puncture of the tire. In particular, a tire has an outer wall surface and an inner wall surface. The tire has a first sidewall and a second sidewall. The tire has a tread portion located on at least a portion of the outer wall surface of the tire. The tire has a first bead having a first bead wire connected to the first sidewall of the tire. The tire has a second bead having a second bead wire connected to the second sidewall of the tire. The first bead and the second bead are connected to a vehicle rim. A novel expandable bladder is retained within the tire and is configured to retain a compressed gas.

The novel expandable bladder has a first sidewall having a first end and a second sidewall having a second end. The expandable bladder has an outer wall surface and an inner wall surface. The inner wall surface of the bladder forms a compartment retaining compressed air. Although the expandable bladder extends between the first bead and the second bead through the first sidewall of the tire, the tread portion of the tire, and the second sidewall of the tire, the bladder is not connected to the entire inner wall surface of the tire. There is a compartment located between the outer wall surface of the expandable bladder and the inner wall surface of the tire. A substance includes, but is not limited to, polymer latex, a substance having a low coefficient of friction, polytetrafluoroethylene which is often used for sliding applications, oil, grease, and/or soapy water. The purpose of this substance is to facilitate the expansion of at least one resilient structure of the bladder by providing a slippery environment inside the tire. In an alternate embodiment, the compartment located between the outer wall surface of the expandable bladder and the inner wall surface of the tire may retain a removable and/or permanently fused barrier element. The barrier element may be formed of alternating rods and stretchable bands oriented in a unique interlocking orientation. The barrier element may comprise a plurality of overlapping bands having a plurality of tooth recesses capable of stretching and deflecting an object, that may have penetrated the tire layer, away from the internal expandable bladder. It is within the scope of this invention for the shape, configuration, and/or interlocking pattern of the bands and rods of the barrier element to not be limited by the preferred and alternate embodiments of this description. The configuration of the barrier element may change in ways not mentioned in this description that will benefit the end product without departing from the scope of the invention.

The first end of the first sidewall of the bladder is connected to at least a portion of the first bead portion of the tire. The second end of the second sidewall of the bladder is connected to at least a portion of the second bead portion of the tire. The first sidewall of the bladder has a third resilient structure. The second sidewall of the bladder has a fourth resilient structure. The third resilient structure of the first sidewall of the bladder is located parallel to the fourth resilient structure of the second sidewall of the bladder. The third resilient structure of the first sidewall of the bladder and the fourth resilient structure of the second sidewall of the bladder are oriented in a substantially vertical configuration, whereby, the third resilient structure of the first sidewall of the bladder and the fourth resilient structure of the second sidewall of the bladder are configured to expand along the y-axis when the force of an object punctures the tire. This expansion along the y-axis lengthens the sidewalls of the bladder to allow the material of the bladder to conform around an end of a nail or any other object attempting to puncture through the tire.

The bladder is configured to conform to the shape of an object that has punctured the tire so that the object does not puncture the bladder to release compressed gas from the bladder and expelled from the tire through the puncture opening. When the side walls of the bladder expand, excess bladder material forms between at least one resilient structure and conforms to the outer perimeter of the object that has punctured through the tire. This internal bladder of the tire allows a tire to resist being punctured by an object, such as a nail, and to not leak compressed gas from the tire. This is achieved by the gathered excess material underneath the bladder, provided from the expansion of at least one resilient structure, to essentially form a barrier layer or capsule along the edge of the puncturing object to block the nail from rupturing the bladder that retains the compressed air. Thus, the tire will maintain its shape and will continue to support the weight of a vehicle even though the puncturing object has penetrated through the tire.

This improved pneumatic tire has a novel leak resistant bladder. The tire has an outer wall surface and an inner wall surface. The tire having an expandable first sidewall and an expandable second sidewall. A tread portion is located on at least a portion of the outer wall surface of the tire. A first bead having a first bead wire is connected to a first sidewall of the tire. A second bead having a second bead wire is connected to a second sidewall of the tire. The first bead and the second bead are connected to a rim. The tire has an internal expandable bladder configured to retain compressed gas. A barrier element is located between the inner wall surface of the tire and a substance layer. The substance layer is located between an inner wall surface of the barrier element and an outer wall surface of the internal expandable bladder. It is also within the scope of this invention got the substance layer to be retained between an inner wall surface of the tire and the barrier element. In particular, the substance layer may be positioned and retained between multiple layers.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustrating specific embodiments by which the invention may be practiced. It is to be understood that other embodiments may be utilized and structural changes may be made without departing from the scope of the invention.

Figure 1:
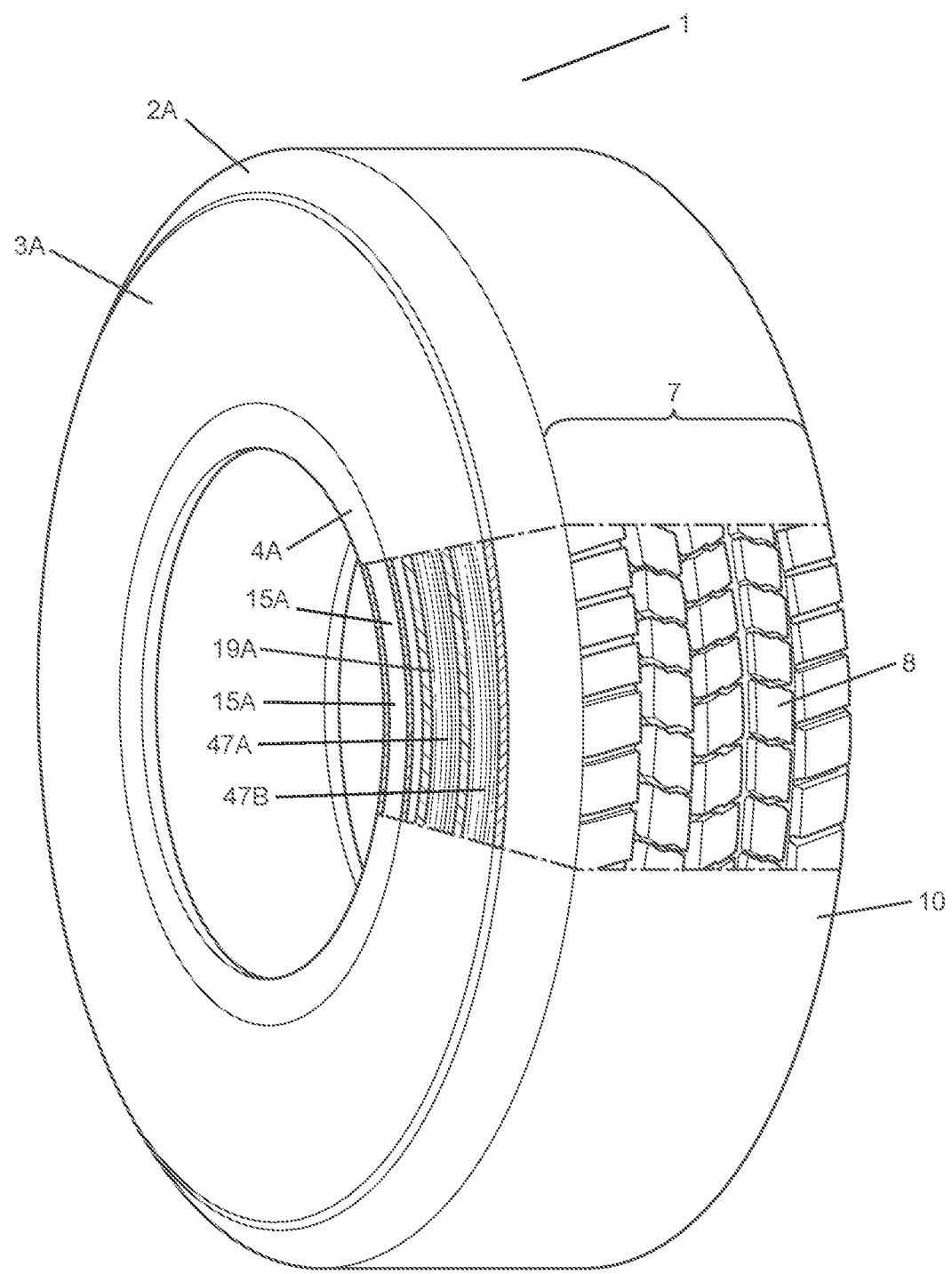
FIG. 1 is a perspective sectional view of the novel pneumatic tire having at least one integrally formed resilient structure.
Figure 2:
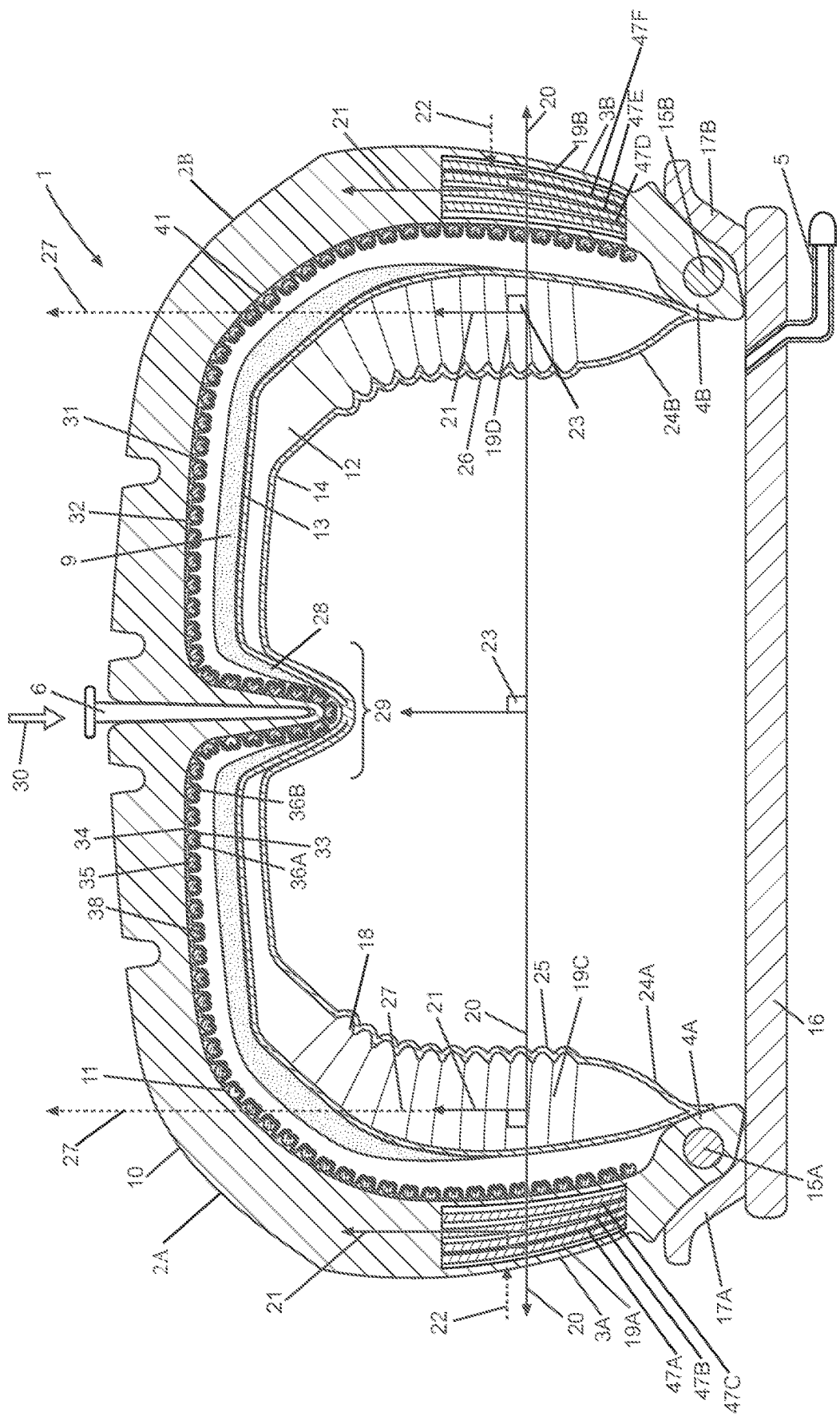
FIG. 2 is a front cut-away view of an object attempting to puncture the novel pneumatic tire having at least one integrally formed resilient structure that is compressed, a barrier layer, a substance layer, and an internal bladder with at least one integrally formed resilient structure that is expanded.
Figure 3:
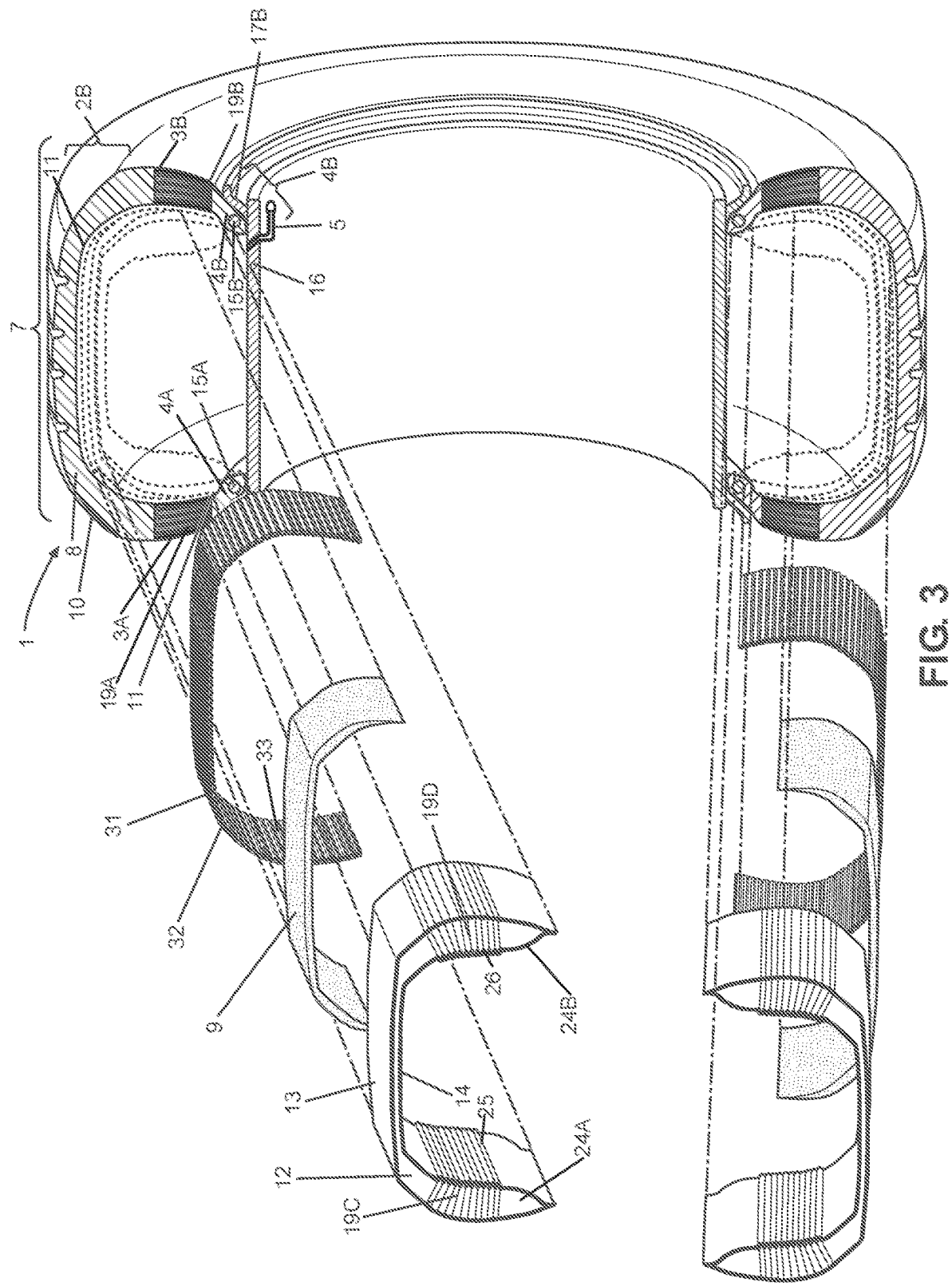
FIG. 3 is an exploded view of the novel pneumatic tire having at least one integrally formed resilient structure, a barrier layer, a substance layer, and an internal bladder with at least one integrally formed resilient structure.
Figure 4:
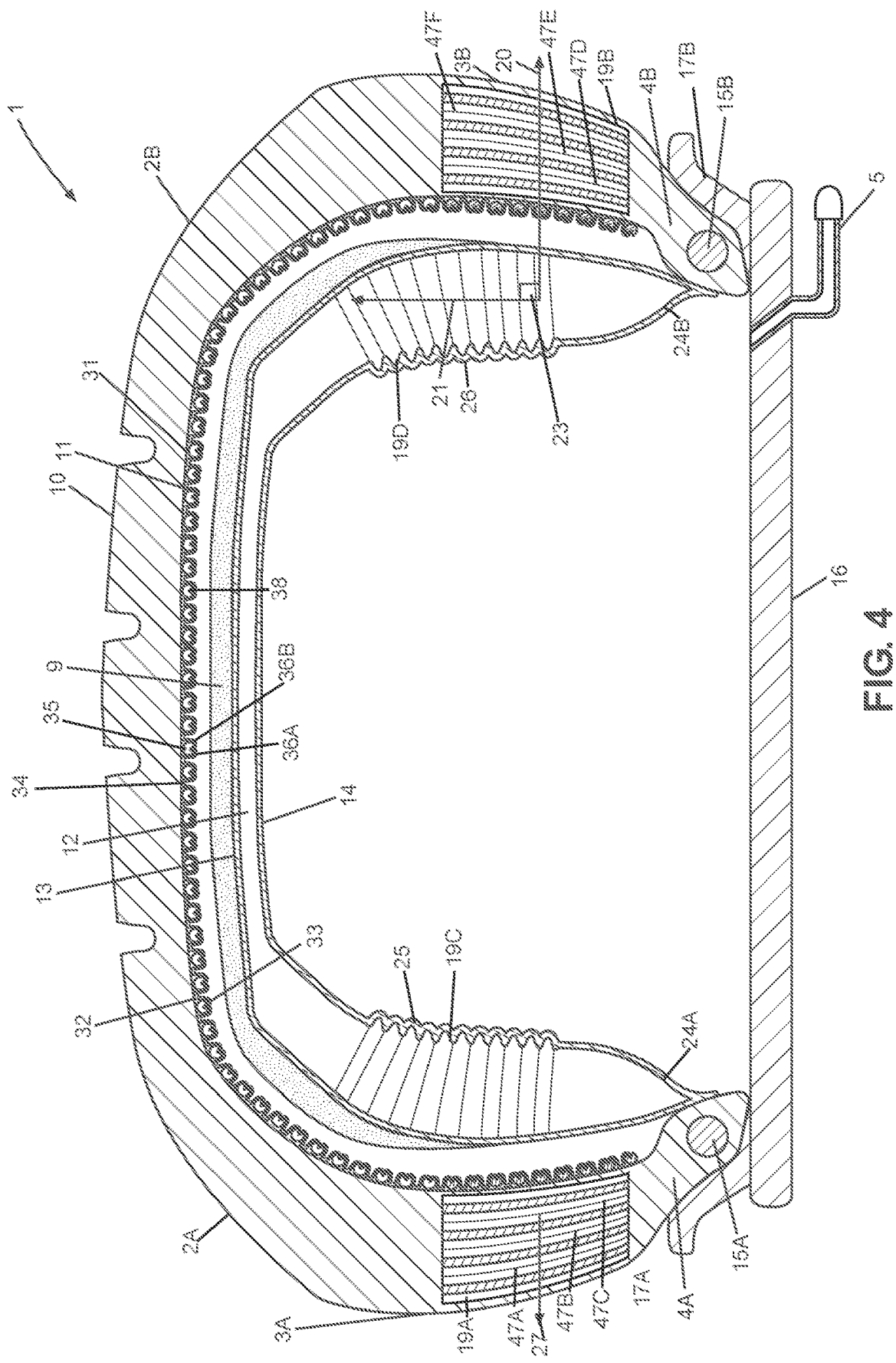
FIG. 4 is a front cut-away view of the novel pneumatic tire having at least one integrally formed resilient structure, a barrier layer, a substance layer, and an internal bladder with at least one integrally formed resilient structures.
Figure 11:
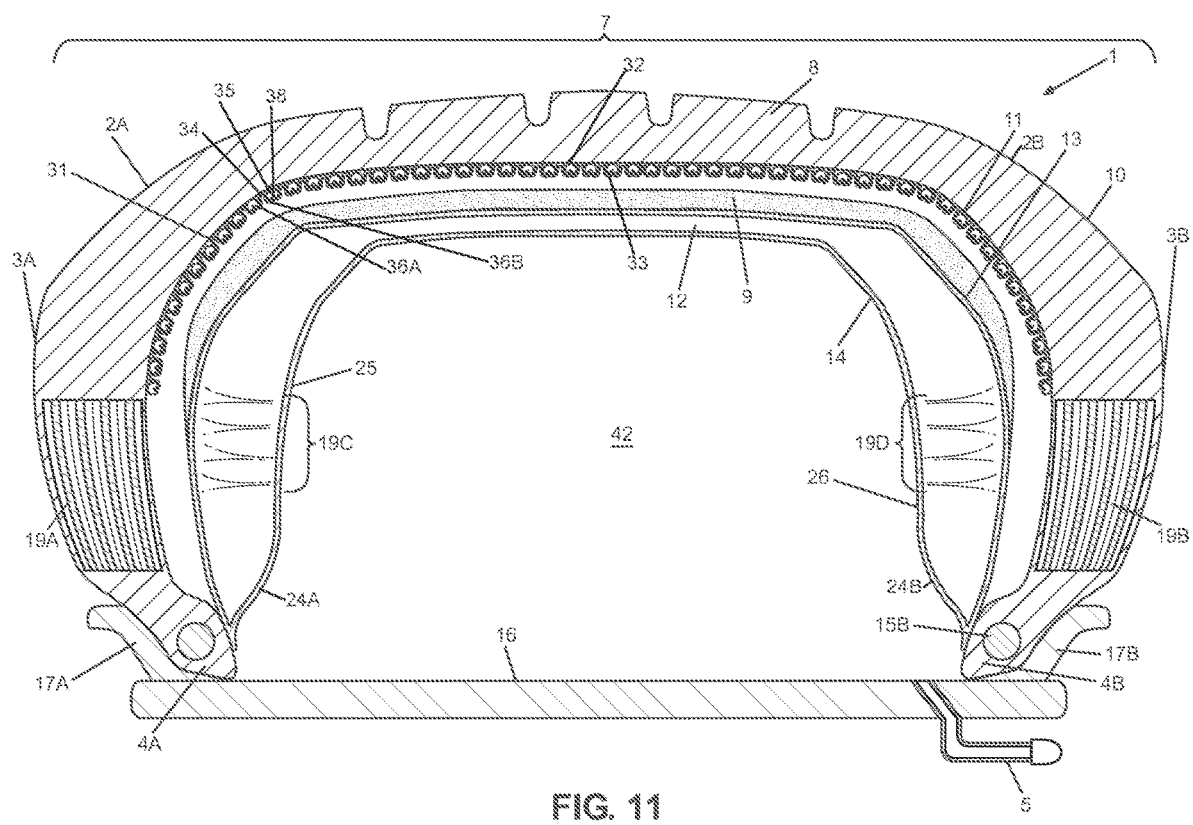
FIG. 11 is a front cut-away view of an alternate embodiment of the novel pneumatic tire having at least one integrally formed resilient structure, a barrier layer, a substance layer, and an internal bladder with the sidewalls being of an expandable material.

In a preferred embodiment, FIGS. 1, 3, and 11 illustrate pneumatic tire 1 having outer wall surface 10 (FIGS. 1-4, and 11) and inner wall surface 11 (FIGS. 2-4, and 11). Tire 1 has first shoulder 2A (FIGS. 1, 2, 4, and 11) and second shoulder 2B (FIGS. 2-4, and 11). Tire 1 has first sidewall 3A (FIGS. 1-4 and 11) and second sidewall 3B (FIGS. 2-4, and 11). Tire 1 has tread portion 8 (FIGS. 1, 3, and 11) located on at least a portion of outer wall surface 10 of tire 1 including, but not limited to, crown 7 (FIGS. 1, 3, and 11). First bead portion 4A (FIGS. 1-4, and 11) has first bead wire 15A (FIGS. 1-4) connected to first sidewall 3A of tire 1. Second bead portion 4B (FIGS. 2-4, and 11) has second bead wire 15B (FIGS. 2-4, and 11) connected to second sidewall 3B of tire 1. It is within the scope of this invention for bead wire 15 to include, but not be limited to, a hoop. FIGS. 2-4, and 11 depict first bead 15A and second bead 15B are connected to tire rim 16 of tire 1. FIGS. 2-4 best show rim 16 having lip 17A (FIGS. 2, 4, and 11) connected to first bead portion 4A (FIGS. 2-4, and 11) and having lip 17B connected to second bead portion 4B. Tire 1 has valve 5 (FIGS. 2-4, and 11).

Figure 10:
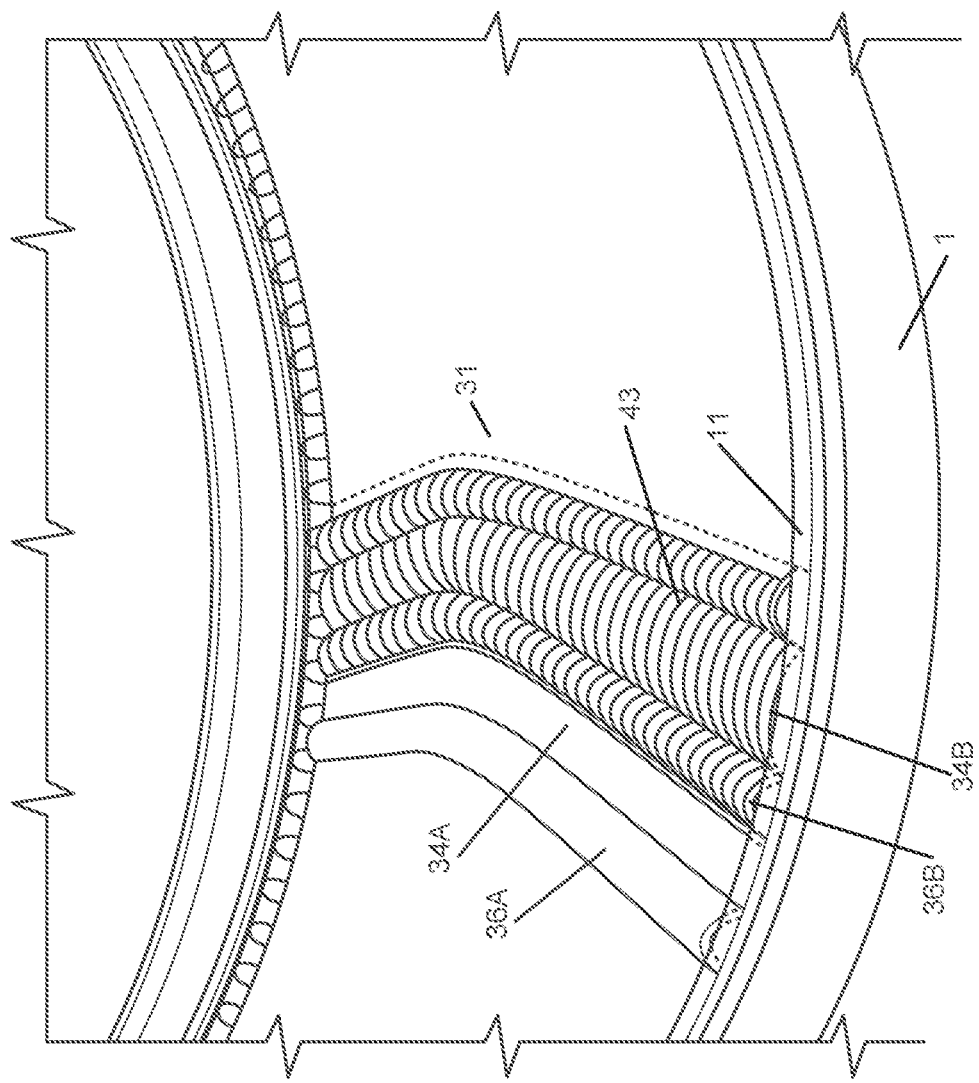
FIG. 10 is a sectional view of the novel pneumatic tire having a barrier element having at least one rod with a recess interlocked with a flexible band with a plurality of tracks has a first lip and a second lip, elastic material of the band is oriented to stretch perpendicular to the rods.

FIGS. 1-4 and 11 illustrate tire 1 having first sidewall 3A having first resilient portion 19A. FIGS. 1, 2, and 4 show first resilient portion 19A having first gusset 47A, second gusset 47B, and third gusset 47C (FIGS. 2 and 4). It is within the scope of this invention for first resilient portion 19A and/or second resilient portion 19B and/or third resilient portion 19C (FIGS. 2-4) and/or fourth resilient portion 19D (FIGS. 2-4) to have at least one gusset, a plurality of gussets, and expandable structure, at least one fold, and/or being made of an elastic and/or any stretchable material 43 (FIG. 10). FIGS. 2 and 4 show second resilient portion 19B having fourth gusset 47D, fifth gusset 47E, and fifth gusset 47F. FIGS. 2 and 4 show how resilient structures 19A and 19B expand and retract along x-axis 20 on graph with 90 degree angle 23 and associated y-axis 21. When nail 6 attempts to penetrate through tire 1, FIG. 2 best shows compression/retraction 22 of gussets 19A and 19B along x-axis 20 and gussets 19C and 19D expand 27 along y-axis 21.

FIGS. 2 and 4 illustrate gussets 47A-47C of first resilient portion 19A of first sidewall 3A of tire1 are located parallel to gussets 47D-47F of second resilient portion 19B of second sidewall 3B of tire 1. FIG. 2 shows gussets 47A-47C of first resilient portion 19A of first sidewall 3A of tire 1 and gussets 47D-47F of second resilient portion 19B of second sidewall 3B of tire 1 being oriented in a substantially vertical configuration to compress 22 folds of gussets 47A-47F about the x-axis 20 when force 30 of object 6 attempts to puncture tire 1. FIG. 4 shows gussets 47A-47C of first resilient portion 19A of first sidewall 3A of tire 1 and gussets 47D-47F of second resilient portion 19B of second sidewall 3B of tire 1 being oriented in a substantially vertical configuration, being expanded 27 about x-axis 20, and not being compressed when no object has attempted to penetrate the tire layer. Referring now to FIG. 2, a sharp object 6 punctures a hole through tire 1, however, nail 6 is deflected because barrier element 31 and bladder 12 move inward with nail 6 due to the expanding/compressing nature of resilient structures 19A-19D and the flexibility of bladder 12 and barrier element 31. As a result, bladder 12 will remain intact and not puncture.

FIGS. 2-4 and 11 illustrate tire 1 having barrier element 31 connected to at least a portion of inner wall surface 11 of tire 1. Barrier element 31 has outer wall surface 32 and inner wall surface 33. Outer wall surface 32 of barrier element 31 is connected to at least a portion of inner wall surface 11 of tire 1. FIG. 11 illustrates outer wall surface 32 of barrier element is connected to at least a portion of inner wall surface 11 of tire 1. Barrier element 31 may or may not extend the entire inner wall surface 11 of tire 1. FIGS. 2, 4, and 11 best show barrier element 31 having at least one flexible band 34 with first lip 36A and second lip 36B. Lips 36A and 36B of band 34 may have a radiused curve configured to catch recess 38 of rod 35. It is within the scope of this invention for barrier element 31 to be removable in an existing tire, whereby, barrier element 31 is connected to at least one bead of a tire and/or at least a portion of an inner wall surface of the tire and/or at least one portion of a sidewall of the tire.

Figure 6:
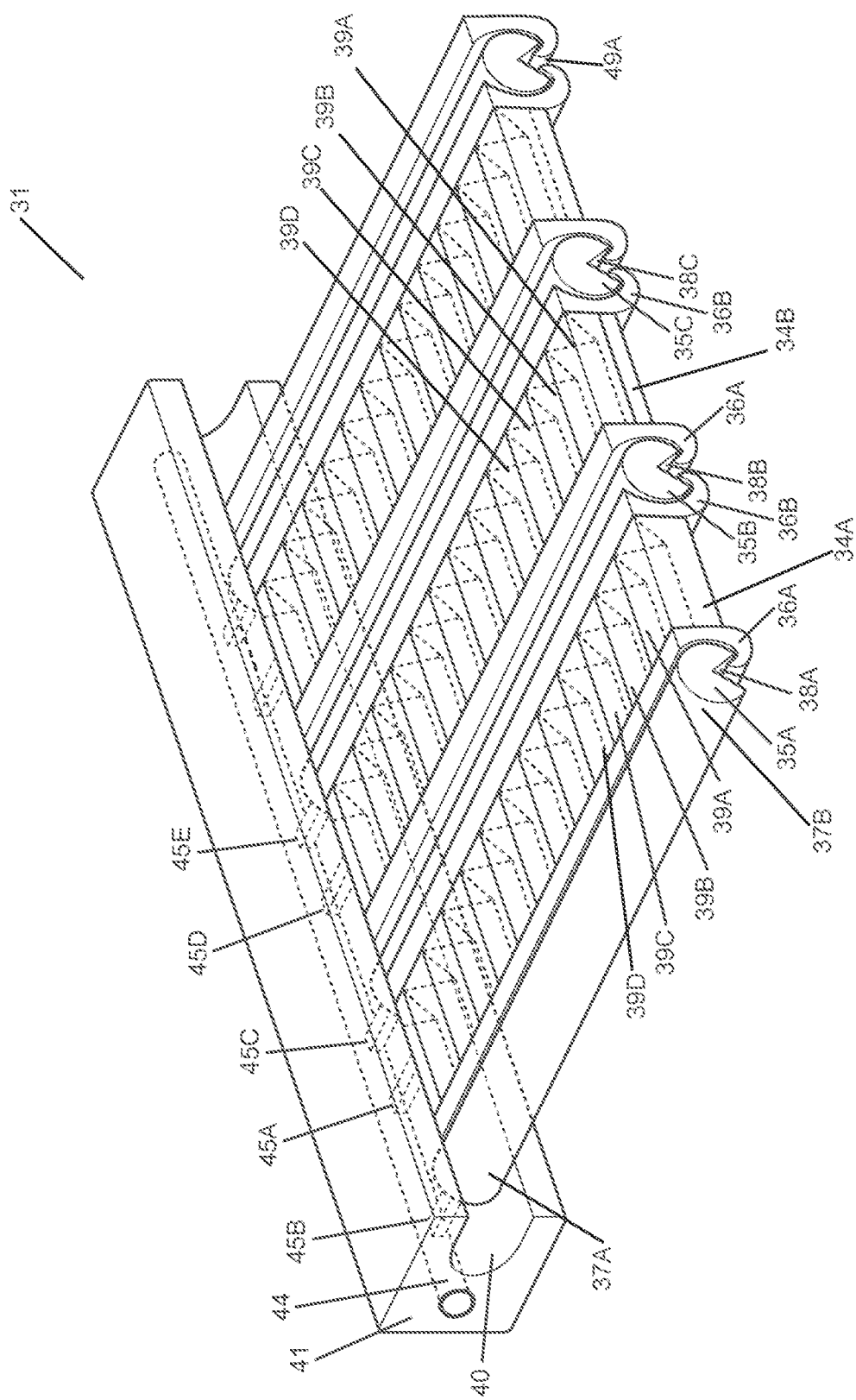
FIG. 6 is a sectional view of the barrier element of the novel pneumatic tire having a housing retaining at least one anchor tube structure with a flexible protrusion extending into a compartment of the housing, a first flexible protrusion is connected to a rod having a recess, a second flexible protrusion is connected to a flexible band having a plurality of tracks oriented perpendicular to the recess of the rod.
Figure 7:
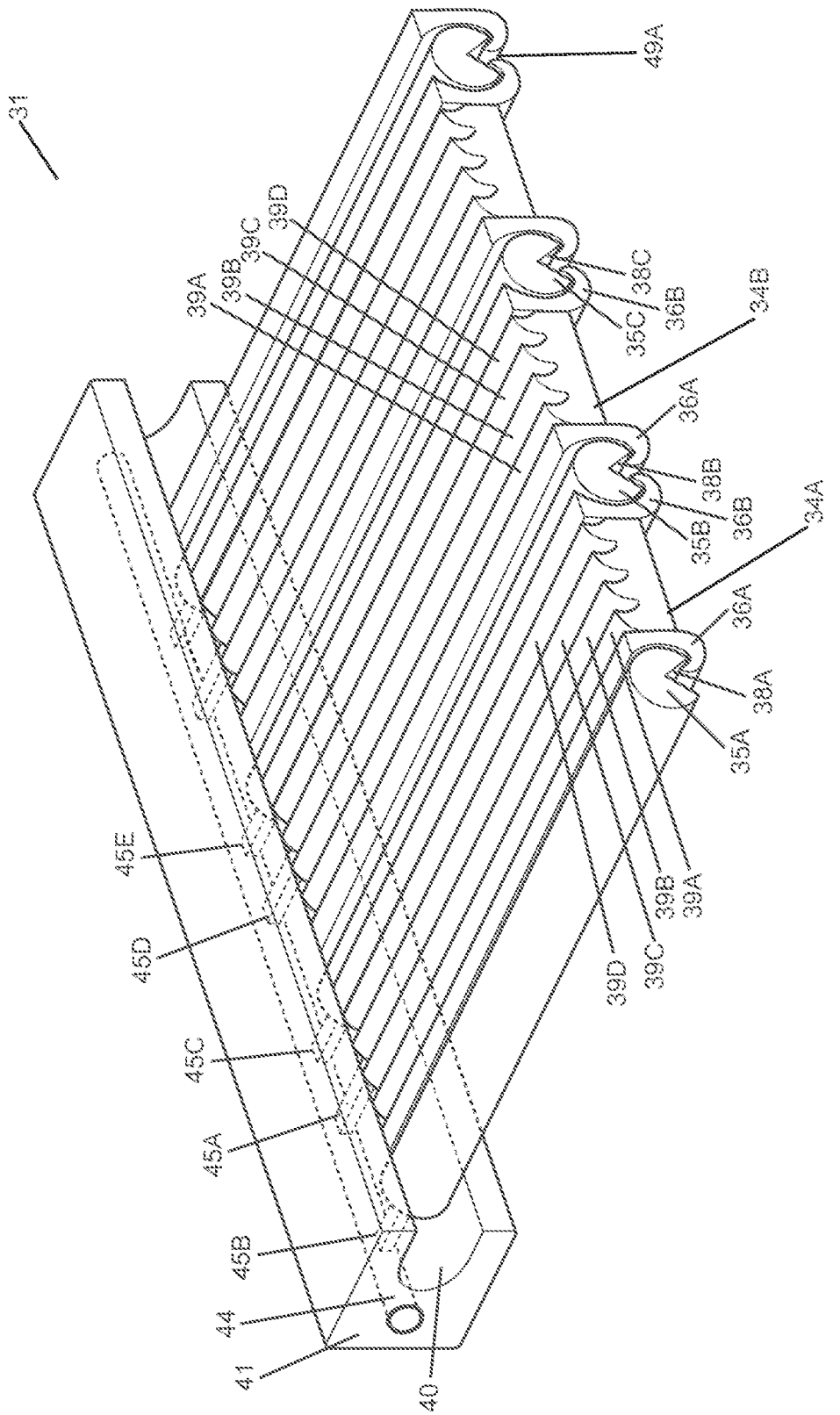
FIG. 7 is a sectional view of the barrier element of the novel pneumatic tire having a housing retaining an anchor tube structure with a flexible protrusion extending into a compartment of the housing, a first flexible protrusion is connected to a rod having a recess, a second flexible protrusion is connected to a flexible band having a plurality of tracks oriented parallel to the recess of the rod.
Figure 8:
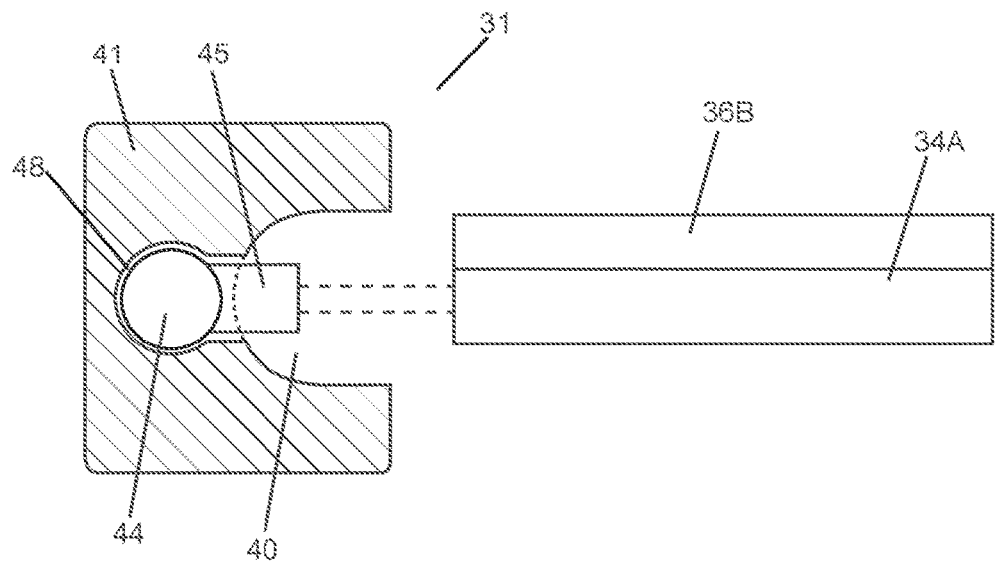
FIG. 8 is an exploded side cut-away view of the barrier element of the novel pneumatic tire having a housing retaining an anchor tube structure with a flexible protrusion extending into a compartment of the housing, a flexible protrusion is configured to be connected to a flexible band having a lip.

FIGS. 6-9 illustrate barrier element 31 having housing 41. Housing 41 has first compartment 48 (FIG. 8) retaining anchor tube structure 44. Anchor tube structure 44 can be made of a flexible material and is connected to at least one flexible protrusion 45A. FIG. 8 illustrates at least a portion of flexible protrusion 45 extends into second compartment 40 of housing 41. An end of flexible protrusion 45 is connected to first flexible band 34A having first lip 36A (FIGS. 6-7 and 9) and second lip 36B (FIGS. 6-9) extending therefrom. This will provide flexibility, stability, arrangement and orientation of the bands from side wall to side wall.

FIGS. 6-7 depict anchor tube structure 44 of housing 41 having first flexible protrusion 45A connected to first flexible band 34A. First rod 35A has an end connected to second flexible protrusion 45B of anchor tube structure 44 of housing 41 located opposite another end connected to another housing 41 (not shown). Second rod 35B has an end connected to third flexible protrusion 45C of anchor tube structure 44 of housing 41 located opposite another end connected to another housing 41 (not shown). Second flexible band 34B has an end connected to fourth flexible protrusion 45D of anchor tube structure 44 of housing 41 located opposite another end connected to another housing 41 (not shown). Third rod 35C has an end connected to fifth flexible protrusion 45E of anchor tube structure 44 of housing 41 located opposite another end connected to another housing 41 (not shown).

Figure 9:
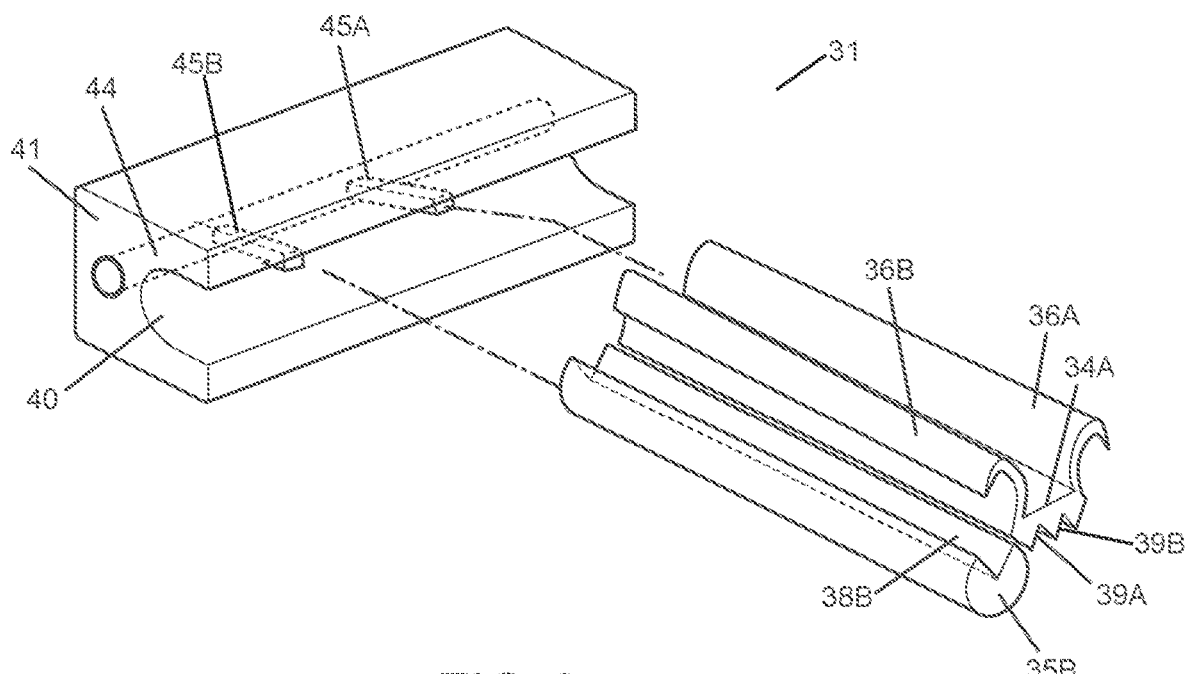
FIG. 9 is an exploded view of the barrier element of the novel pneumatic tire having a housing retaining an anchor tube structure with a first flexible protrusion extending into a compartment of the housing, the first flexible protrusion is connected to a rod having a recess, a second flexible protrusion is connected to a flexible band having a plurality of tracks oriented parallel to the recess of the rod.

FIG. 9 illustrates first flexible band 34A having first side with first lip 36A and second side with second lip 36B. First flexible band 34A is connected to at least a portion of first flexible protrusion 45 of anchor tube structure 44, whereby, at least a portion of first flexible band 34A is retained within second compartment 40 of housing 41 of barrier element 31. The portion of any flexible protrusion 45 including, but not limited to, first flexible protrusion 45 that extends into compartment 40 is the end of first flexible protrusion 45 that is connected to flexible band 34 and/or rod 35. FIG. 9 shows first flexible protrusion 45A having one end connected to anchoring structure 44 located opposite another end connected to flexible band 34A. FIG. 9 also depicts second flexible protrusion 45B having one end connected to anchoring structure 44 of housing 41 of barrier element 31 located opposite another end connected to rod 35A. Rod 35B has recess 38. Lip 36B of first flexible band is retained within recess 38 of rod 35B in an interlocking orientation. It is within the scope of this invention for housing 41 of barrier element to be integrally formed within tire 1 and/or to be connected to at least a portion of inner wall surface 11 of tire 1.

FIGS. 6-7 and 9 illustrate flexible band 34A and 34B (FIGS. 6-7) each having first lip 36A and second lip 36B. It is within the scope of this invention for lip 36 of flexible band 34 to have a radiused shape capable of hooking, interlocking, connecting, catching, and/or being retained by recess 38 of rod 36. Recess 38 of rod 35 has a recess 38 capable of receiving and retaining at least a portion of lip 36 of flexible band 34. In particular, at least one track 39 traverses the length of at least one of first band 34A and/or second band 34B. In an example, FIG. 9 illustrates first flexible band 34A having tracks 39A-39B. A track 39 may include, but are not limited to, a channel, a recess, and/or a gusset configured to deflect a nail (not shown) from penetrating through barrier element 31. It is within the scope if the current invention for at least one track 39 of flexible band 34 to be oriented in an opposite direction in relation to recess 38 of rod 35. In another example, FIGS. 6-7 shows first flexible band 34A and second flexible band 34B have plurality of tracks 39A-39D. In the embodiment illustrated in FIG. 7, track 35 may have a curved high point similar to a wave shape and/or track 35 may have a substantially V-shaped tooth recess and/or expandable gusset as shown in FIG. 9. In the embodiment of FIGS. 7 and 9, track 35 of flexible band 34 traverses the length of flexible band 34 from the length running from flexible protrusion 45 of first housing 41 to second housing 41B (not shown) and track 35 runs parallel to recess 38 of rod 35. In another embodiment illustrated in FIG. 6, track 35 of flexible band 34 first flexible band runs perpendicular to recess 38 of rod 35.

Figure 5:
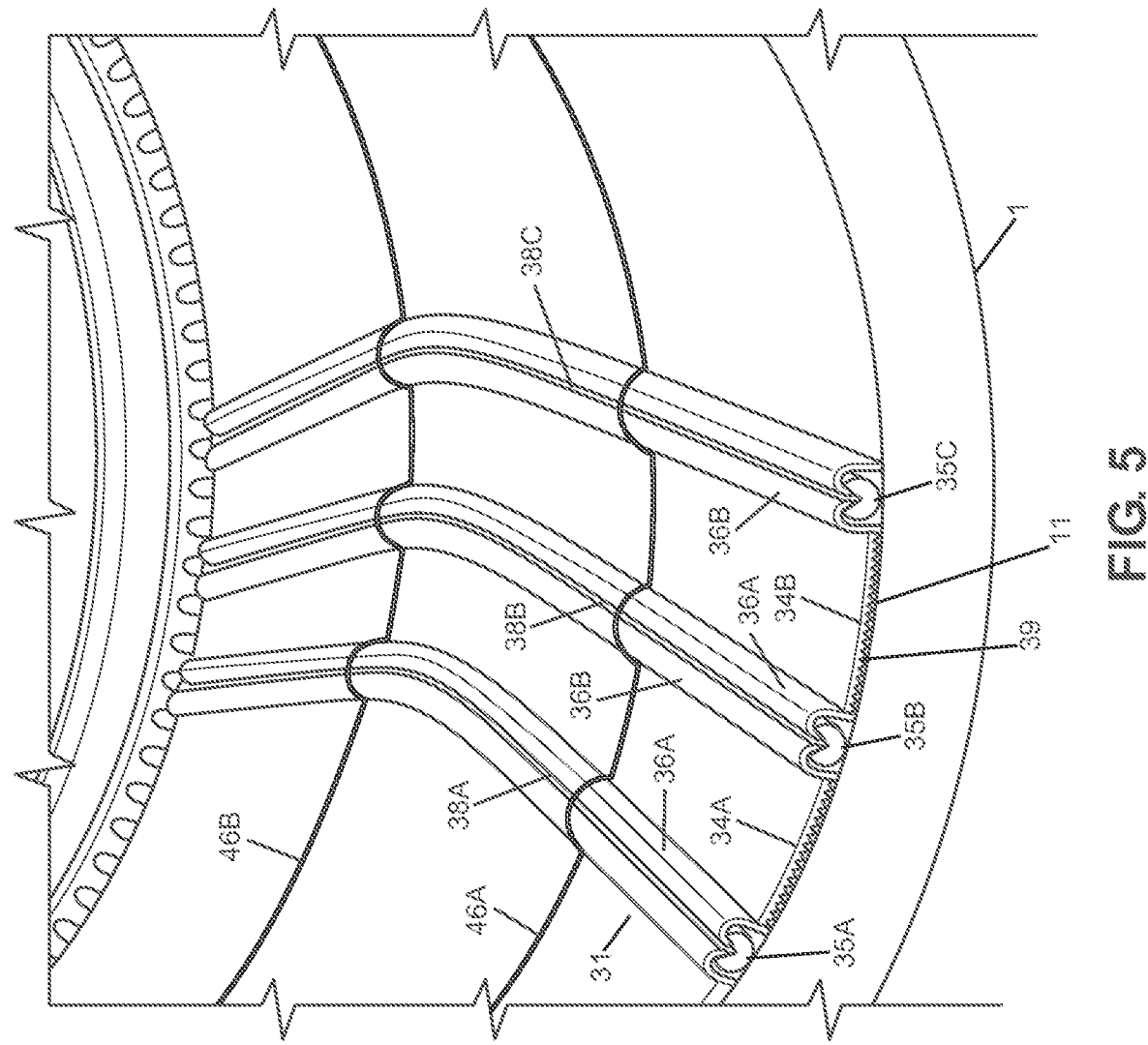
FIG. 5 is a sectional view of the novel pneumatic tire having a barrier element having at least one rod with a recess interlocked with a flexible band with a plurality of tracks has a first lip and a second lip, the plurality of tracks the band are oriented parallel to the recess of the rod.

FIG. 5 best illustrates at least one track 39 of flexible band 34 located on a surface of flexible band abutting inner wall surface 11 of tire 1. At least one track 39 of flexible band 34 is facing towards inner wall surface 11 of tire 1 so that an object (not shown) can be captured within track 39 and then deflected away from barrier element 31 as barrier element 31 stretches. In contrast, recess 38 of rod 35 is facing away from inner wall surface 22 of tire 1. Hoop 46A and 46B are connected to flexible band 34 and lip 34A and 34B of barrier element 31 to secure it into place so it stay in place. At least one hoop 46 is connected to the side of flexible band 34 that is located opposite at least one track 39. Referring now to FIGS. 5, 6, and 7, rod 35A has recess 38A. First flexible band 34A has first lip 36A and second lip 36B. First lip 36A of first flexible band 34A is received by first recess 38A of first rod 35A. Second lip 36 B of first flexible band 34A is received by second recess 38B of second rod 35B. First lip 36A of second flexible band 34B is received by second recess 38B of second rod 35B. Second lip 36B of second flexible band 34B is received by third recess 38C of third rod 35C.

FIG. 6 illustrates anchor tube structure 44 having a second flexible protrusion 45B. At least a portion of second flexible protrusion 45B extends into compartment 40 of housing 41 of barrier element 31. Rod 35A has first end 37A located opposite second end 37B. First end 37A of rod 35A is configured to be retained within compartment 40 of housing 41 of barrier element 31. Second end 37B of rod 35B may be retained within another compartment (not shown) of a second housing (not shown) of a second barrier element (not shown).

FIGS. 2-4 and 11 illustrate tire 1 having substance layer 9 located between at least a portion of inner wall surface 33 of barrier element 31 and at least a portion of outer wall surface 13 of bladder 12. It is within the scope of this invention for substance layer 9 to have a low coefficient of friction, being soapy water, being oil, being grease, being any slippery substance, being polymer latex, and/or being polytetrafluoroethylene. Substance 9 may be a gel layer, a solid, and/or a fluid. FIG. 2 illustrates substance 9 being a grease/oil type fluid that may flow 28 when object 6 attempts to penetrate through tire 1. It is within the scope of this invention for substance layer 9 to be located between at least a portion of inner wall surface 11 of tire 1 and outer wall surface 13 of bladder 12. Bladder 12 has first sidewall 25 having first end 24A and second sidewall 26 having second end 24B. Bladder 12 has outer wall surface 13 and inner wall surface 14. Bladder 12 extends between first bead 15A and second bead 15B through first sidewall 3A of tire 1, tread portion 8, and second sidewall 3B of tire 1. First end 24A of first sidewall 25 of bladder 12 is connected to first bead and/or first bead portion 4A. Second end 24B of second sidewall 26 of bladder 12 is connected to second bead 4B and/or second bead portion. It is within the scope of this invention for compressed air 42 (FIG. 11) to be retained within inner wall surface side 14 of bladder 12. FIG. 11 is an embodiment of FIGS. 2-4 in which resilient structures 19C-19D are stretchy/and/or elastic. FIGS. 2-4 and 11 illustrate an embodiment of novel tire having barrier element 31 oriented to traverse around the tire about the x-axis. FIGS. 5 and 10 illustrate an embodiment of novel tire having barrier element 31 oriented to traverse across from side to side of the tire about the y-axis.

Referring again to FIGS. 2-4, it is within the scope of this current invention for first sidewall 25 of bladder 12 to have third resilient portion 19C. Second sidewall 26 of bladder 12 has fourth resilient portion 19C. Resilient portions 19A-19C may have at least one gusset, a plurality of gussets, at least one fold, and/or being made of an expandable 18 (FIG. 2), and/or elastic and/or any stretchable material (FIG. 11). Third resilient portion 19C of first sidewall 25 of bladder 12 is located parallel to fourth resilient portion 19D of second sidewall 26 of bladder 12. Third resilient portion 19C of first sidewall 25 of bladder 12 and fourth resilient portion 19B of second sidewall 26 of bladder 12 are oriented to have a substantially vertical configuration, whereby, third resilient portion 19C of first sidewall 25 of bladder 12 and fourth resilient portion 19C of second sidewall 19D of bladder 12 are configured to expand/elongate 27 (FIG. 2) along y-axis 21 when force 30 (FIG. 2) of object 6 (FIG. 2) attempts to puncture tire1. Bladder 12, barrier element 31, substance 9 are configured to conform 29 (FIG. 2) to the shape of object 6 that has attempted to puncture tire 1 so that object 6 does not puncture bladder 12, resulting in a release of compressed air 42 (FIG. 11). Substance 9 is a slippery substance such as, oil, that allows internal bladder 12 to slide and move freely without catching on barrier element 31 during deformation/conforming 29 (FIG. 2) of tire 1 components during an attempted nail 6 (FIG. 2) puncture. Barrier element 31 has outer wall surface 32 located opposite inner wall surface 33. It is within the scope of this invention for inner wall surface 33 to be first lip 36A and second lip 36B of flexible band 34. Inner wall surface 33 is facing towards and/or abuts and/or overlays substance 9.

Figure 12:
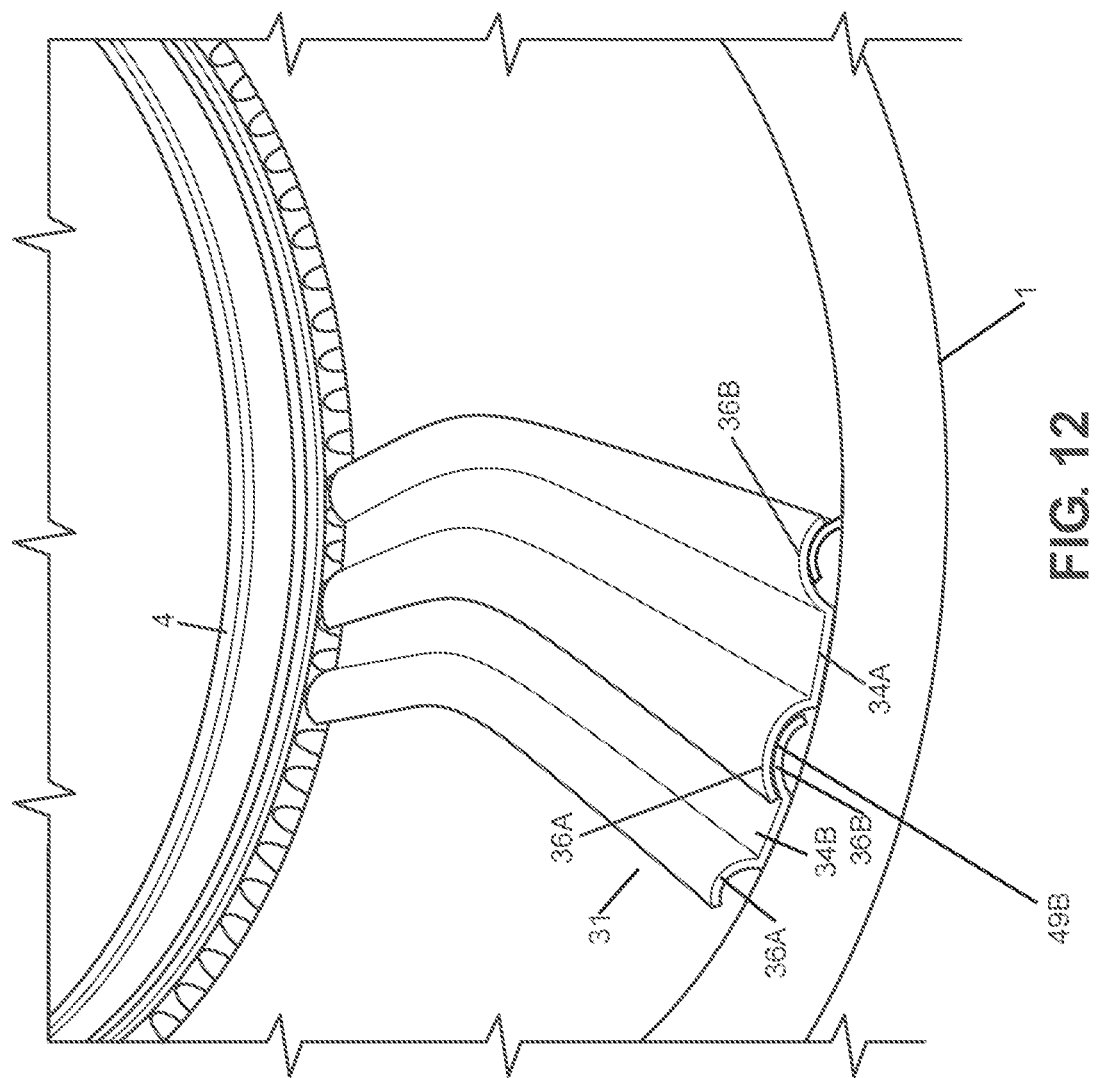
FIG. 12 is a perspective view of an alternate embodiment of the novel pneumatic tire having a barrier element having a first band with a first lip and a second lip, the first lip of the first band overlays the second lip of a second band; and, FIG. 13 is a cut-away view of an alternate embodiment of the barrier element of the novel pneumatic tire having a housing retaining an anchor tube structure with a first flexible protrusion extending into a compartment of the housing, the first flexible protrusion is connected to a first band having a first lip and a second lip, a second flexible protrusion is connected to a second flexible band having a first lip and a second lip.
Figure 13:
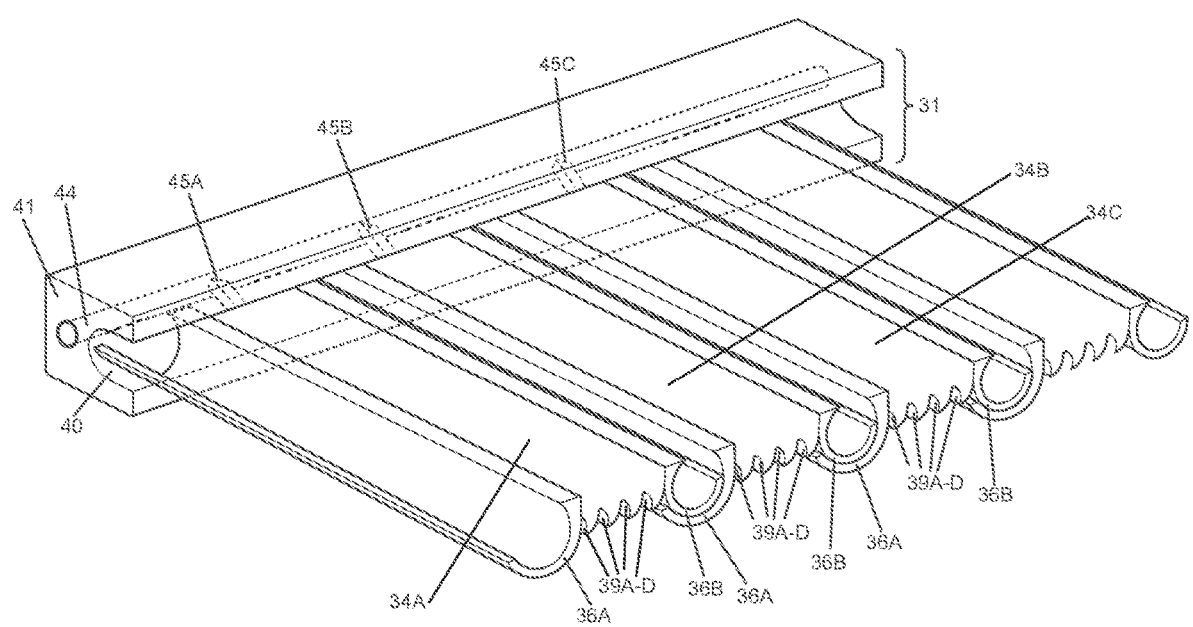

FIGS. 10 and 12-13 illustrate an alternate embodiment of barrier element 31 of FIGS. 2-9, and 11 having flexible band 34A with first lip 36A and second lip 36B, but without rod 35. In particular, FIG. 11 illustrates, housing 41 of barrier element 31 retaining anchor tube structure 44. Anchor tube structure 44 is connected to first flexible protrusion 45A, second flexible protrusion 45B, and third flexible protrusion 45C. At least a portion of flexible protrusion 45 extends into compartment 40 of housing 41 of barrier element 31. First band 34A has a first side with first lip 36A and a second side with second lip 36B. First band 34A is connected to at least a portion of first flexible protrusion 45A, whereby, at least a portion of first band 34A is retained within compartment 40 of housing 41 of barrier element 31. Flexible bands 34A-34C may have at least one track or plurality of tracks 39A-39D traversing the length of flexible band 34. Anchor tube structure 44 is made of a flexible material such as rubber and/or elastic material that is capable of stretching to absorb some of the impact of an object attempting to penetrate through the novel tire by movement of bands 34A-34C to facilitate redirecting the trajectory and/or the direction of the object. Anchor tube structure 44 may have second flexible protrusion 45B. At least a portion of second flexible protrusion 45B extends into compartment 40 of housing 41 of barrier element 31. Anchor tube structure 44 has third flexible protrusion 45C. At least a portion of third flexible protrusion 45C extends into compartment 40 of housing 41 of barrier element 31. Second band 34B has a first side with first lip 36A and a second side with second lip 36B. First lip of second band 34B overlays second lip 36B of first band 34A. It is within the scope of this invention for at least one lip 36 of any band 34 of barrier element 31 to overlay at least one lip 36 of another band 34. If a nail, for example, hits lip 36A and/or 36B, the nail will deflect to the band portion 34 in an attempt to guide the nail away from penetrating bladder 12. FIG. 10 illustrates the underneath view of band 34A and 34B and band 34B having lip 36A (not shown) being underneath lip 36B of band 34A. It is within the scope of this invention for band 34 and lips 36A-36B to be made of a flexible material 43, such as an elastic material, cord, and/or cable that stretches. The bands 34A-34B could have tracks 39 (not shown) and/or be oriented in any direction to allow for stretching of barrier element 31 to occur. An end of barrier element 31 is connected to housing 11. Housing 11 is connected to tire 1. Barrier element 31 in any embodiment, may support the weight of a vehicle in the event the bladder 12 is punctured and releases compressed air retained within tire 1.

Referring now to FIG. 12, is within the scope of this invention for an alternate embodiment of barrier element 31 having capturing structure 49A (FIGS. 6-7) being an interlocking mechanism being first lip 36A and second lip 36B being received by recess 38 of rod 35 or alternatively as best shown in FIG. 12, barrier element 31 has capturing structure 49B being first lip 36A of first band 34A overlaps second lip 36B of second band 34B. It is within the scope of this invention for plurality of overlapping bands 34 to be made of a pliable material. This alternate embodiment may have plurality of tracks 39 (not shown) traversing the length of band 34.

In some aspects, the techniques described herein relate to a pneumatic tire having a leak resistant bladder, including: a tire, said tire having an outer wall surface and an inner wall surface, said tire having a first sidewall and a second sidewall; said first sidewall of said tire having a first resilient portion; said second sidewall of said tire having a second resilient portion, said first resilient portion of said first sidewall of said tire is located parallel to said second resilient portion of said second sidewall of said tire, said first resilient portion of said first sidewall of said tire and said second resilient portion of said second sidewall of said tire are oriented on a substantially horizontal configuration, whereby, said first resilient portion of said first sidewall of said tire and said second resilient portion of said second sidewall of said tire are configured to compress along an x-axis when a force of an object contacts said tire; a tread portion said tread portion is located on at least a portion of said outer wall surface of said tire; a first bead having a first bead wire is connected to said first sidewall of said tire; a second bead having a second bead wire is connected to said second sidewall of said tire, whereby, said first bead and said second bead are configured to connect to a rim; a bladder, said bladder having a first sidewall located opposite a second sidewall, said first sidewall of said bladder having a first end and said second sidewall of said bladder having a second end, said bladder having an outer wall surface and an inner wall surface, at least a portion of said first sidewall of said bladder is connected to at least a portion of said first sidewall of said tire and/or at least a portion of said first bead, at least a portion of said second sidewall of said bladder is connected to at least a portion of said second sidewall of said tire and/or at least a portion of said second bead; said first sidewall of said bladder having a third resilient portion; and said second sidewall of said bladder having a fourth resilient portion, said third resilient portion of said first sidewall of said bladder is located parallel to said fourth resilient portion of said second sidewall of said bladder, said third resilient portion of said first sidewall of said bladder and said fourth resilient portion of said second sidewall of said bladder are oriented on a substantially vertical configuration, whereby, said third resilient portion of said first sidewall of said bladder and said fourth resilient portion of said second sidewall of said bladder are configured to expand along a y-axis when the force of an object contacts said tire, said bladder is configured to conform to a shape of the object that has contacted said tire so that the object does not puncture said bladder.

In some aspects, the techniques described herein relate to a pneumatic tire, further including: said first resilient portion, said second resilient portion, said third resilient portion, and said fourth resilient portion include a plurality of accordion gussets.

In some aspects, the techniques described herein relate to a pneumatic tire, further including: said first resilient portion, said second resilient portion, said third resilient portion, and said fourth resilient portion is an elastic material.

In some aspects, the techniques described herein relate to a pneumatic tire, further including: a barrier element, said barrier element having an outer wall surface and an inner wall surface, said barrier element is connected to at least a portion of said inner wall surface of said tire.

In some aspects, the techniques described herein relate to a pneumatic tire, further including: said barrier element, including: a housing, said housing retaining an anchor tube structure, said anchor tube structure is connected to a first flexible protrusion, at least a portion of said first flexible protrusion extends into a compartment of said housing; a first band, said first band having a first side with a first lip and a second side with a second lip, said first band is connected to at least a portion of said first flexible protrusion, whereby, at least a portion of said first band is retained within said compartment of said housing; said anchor tube structure having a second flexible protrusion, at least a portion of said second flexible protrusion extends into a compartment of said housing; a rod, said rod having a recess, said rod is connected to at least a portion of said second flexible protrusion, whereby, at least a portion of said rod is retained within said compartment of said housing; said anchor tube structure having a third flexible protrusion, at least a portion of said third flexible protrusion extends into a compartment of said housing; a second band, said second band having a first side with a first lip and a second side with a second lip, said second band is connected to at least a portion of said third flexible protrusion, whereby, at least a portion of said second band is retained within said compartment of said housing; and said first lip of said first band is retained within said recess of said rod, said second lip of said second band is retained within said recess of said rod.

In some aspects, the techniques described herein relate to a pneumatic tire, further including: at least one of said first band and/or said second band having a plurality of tracks, said plurality of tracks traversing a length of said at least one of said first band and/or said second band.

In some aspects, the techniques described herein relate to a pneumatic tire, further including: said plurality of tracks of said at least one of said first band and/or said second band are oriented parallel to said recess of said rod.

In some aspects, the techniques described herein relate to a pneumatic tire, further including: said barrier element, including: a housing, said housing retaining an anchor tube structure, said anchor tube structure is connected to a first flexible protrusion, at least a portion of said first flexible protrusion extends into a compartment of said housing; a first band, said first band having a first side with a first lip and a second side with a second lip, said first band is connected to at least a portion of said first flexible protrusion, whereby, at least a portion of said first band is retained within said compartment of said housing; said anchor tube structure having a second flexible protrusion, at least a portion of said second flexible protrusion extends into a compartment of said housing; said anchor tube structure having a third flexible protrusion, at least a portion of said third flexible protrusion extends into a compartment of said housing; a second band, said second band having a first side with a first lip and a second side with a second lip, said second band is connected to at least a portion of said third flexible protrusion, whereby, at least a portion of said second band is retained within said compartment of said housing; and said first lip of said first band is overlays said second lip of said second band.

In some aspects, the techniques described herein relate to a pneumatic tire, further including: at least one of said first band and/or said second band having a plurality of tracks, said plurality of tracks traversing a length of said at least one of said first band and/or said second band.

In some aspects, the techniques described herein relate to a pneumatic tire, further including: a substance layer is located between at least a portion of said inner wall surface of said barrier element and at least a portion of said outer wall surface of said bladder.

In some aspects, the techniques described herein relate to a pneumatic tire, further including: said substance layer having a low coefficient of friction.

In some aspects, the techniques described herein relate to a pneumatic tire, further including: a substance layer is located between at least a portion of said inner wall surface of said tire and said outer wall surface of said bladder.

In some aspects, the techniques described herein relate to a pneumatic tire, further including: said substance layer having a low coefficient of friction.

In some aspects, the techniques described herein relate to a pneumatic tire having a leak resistant bladder, including: a tire, said tire having an outer wall surface and an inner wall surface, said tire having a first sidewall and a second sidewall; a tread portion said tread portion is located on at least a portion of said outer wall surface of said tire; a first bead having a first bead wire is connected to said first sidewall of said tire; a second bead having a second bead wire is connected to said second sidewall of said tire, whereby, said first bead and said second bead are configured to connect to a rim; and a bladder, said bladder is configured to retain compressed gas, said bladder having a first sidewall located opposite a second sidewall, said first sidewall of said bladder having a first end and said second sidewall of said bladder having a second end, said bladder having an outer wall surface and an inner wall surface, at least a portion of said first sidewall of said bladder is connected to at least a portion of said first sidewall of said tire and/or at least a portion of said first bead, at least a portion of said second sidewall of said bladder is connected to at least a portion of said second sidewall of said tire and/or at least a portion of said second bead.

In some aspects, the techniques described herein relate to a pneumatic tire, further including: said bladder having a pair of expandable structures, said pair of expandable structures of said bladder are located parallel to each other, said pair of expandable structures of said bladder are oriented on a substantially vertical configuration, whereby, said pair of expandable structures of said bladder are configured to expand along a y-axis when a force of an object contacts said tire, whereby, said bladder is configured to conform to a shape of the object that has contacted said tire so that the object does not puncture said bladder.

In some aspects, the techniques described herein relate to a pneumatic tire, further including: said bladder is made of an elastic material.

In some aspects, the techniques described herein relate to a pneumatic tire, further including: said tire having a pair of expandable structures, said pair of expandable structures of said tire are located parallel to each other, said pair of expandable structures of said tire are oriented on a substantially horizontal configuration, whereby, said pair of expandable structures of said bladder are configured to compress along a x-axis when a force of an object contacts said tire.

In some aspects, the techniques described herein relate to a pneumatic tire, further including: the expandable structures of said tire are made of an elastic material.

In some aspects, the techniques described herein relate to a pneumatic tire, further including: a barrier element, said barrier element having an outer wall surface and an inner wall surface, said barrier element is connected to said inner wall surface of said tire.

In some aspects, the techniques described herein relate to a pneumatic tire, further including: a substance layer is located between at least a portion of said inner wall surface of said barrier element and at least a portion of said outer wall surface of said bladder.

In some aspects, the inner surface of the tire can take various shapes including, but not limited to, smooth, zigzag, wavy, and/or a combination of more than one type of surface. The bands may or may not follow the same patterns as the inner surface of the tire.

The described embodiments are illustrative of the invention and are not exhaustive thereof. As the pneumatic tire industry adds additional or different restrictions on tire manufacturing requirements to meet industry standards, still further resilient structures may be required in future embodiments of the invention but all such future embodiments are within the scope of this invention.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the description is intended to cover all of the generic and specific features of the invention herein described, and all statements of the scope of the invention that, as a matter of language, might be said to fall therebetween. Now that the invention has been described.

The invention claimed is:

1. A pneumatic tire having a leak resistant bladder, comprising:
   a tire, said tire having an outer wall surface and an inner wall surface, said tire having a first sidewall and a second sidewall;
   said first sidewall of said tire having a first resilient portion;
   said second sidewall of said tire having a second resilient portion, said first resilient portion of said first sidewall of said tire is located parallel to said second resilient portion of said second sidewall of said tire, said first resilient portion of said first sidewall of said tire and said second resilient portion of said second sidewall of said tire are oriented on a substantially horizontal configuration, whereby, said first resilient portion of said first sidewall of said tire and said second resilient portion of said second sidewall of said tire are configured to compress along an x-axis when a force of an object is applied to said tire;

a tread portion said tread portion is located on at least a portion of said outer wall surface of said tire;

a first bead having a first bead wire is connected to said first sidewall of said tire;

a second bead having a second bead wire is connected to said second sidewall of said tire, whereby, said first bead and said second bead are configured to connect to a rim;

a bladder, said bladder having a first sidewall located opposite a second sidewall, said first sidewall of said bladder having a first end and said second sidewall of said bladder having a second end, said bladder having an outer wall surface and an inner wall surface, at least a portion of said first sidewall of said bladder is connected to at least a portion of said first sidewall of said tire and/or at least a portion of said first bead, at least a portion of said second sidewall of said bladder is connected to at least a portion of said second sidewall of said tire and/or at least a portion of said second bead;

said first sidewall of said bladder having a third resilient portion;

said second sidewall of said bladder having a fourth resilient portion, said third resilient portion of said first sidewall of said bladder is located parallel to said fourth resilient portion of said second sidewall of said bladder, said third resilient portion of said first sidewall of said bladder and said fourth resilient portion of said second sidewall of said bladder are oriented on a substantially vertical configuration, whereby, said third resilient portion of said first sidewall of said bladder and said fourth resilient portion of said second sidewall of said bladder are configured to expand along a y-axis when the force of an object is applied to said tire, said bladder is configured to conform to a shape of the object that has been applied to said tire so that the object does not puncture said bladder; and a barrier element, said barrier element having an outer wall surface and an inner wall surface, said barrier element is connected to at least a portion of said inner wall surface of said tire; and wherein said barrier element, comprising:

a housing, said housing retaining an anchor tube structure, said anchor tube structure is connected to a first flexible protrusion, at least a portion of said first flexible protrusion extends into a compartment of said housing;

a first band, said first band having a first side with a first lip and a second side with a second lip, said first band is connected to at least a portion of said first flexible protrusion, whereby at least a portion of said first band is retained within said compartment of said housing;

said anchor tube structure having a second flexible protrusion, at least a portion of said second flexible protrusion extends into a compartment of said housing;

a rod, said rod having a recess, said rod is connected to at least a portion of said second flexible protrusion, whereby, at least a portion of said rod is retained within said compartment of said housing;

said anchor tube structure having a third flexible protrusion, at least a portion of said third flexible protrusion extends into a compartment of said housing;

a second band, said second band having a first side with a first lip and a second side with a second lip, said second band is connected to at least a portion of said third flexible protrusion, whereby, at least a portion of said second band is retained within said compartment of said housing; and said first lip of said first band is retained within said recess of said rod, said second lip of said second band is retained within said recess of said rod.

2. The pneumatic tire of claim 1, further comprising:
said first resilient portion, said second resilient portion, said third resilient portion, and said fourth resilient portion comprise a plurality of accordion gussets.

3. The pneumatic tire of claim 1, further comprising:
said first resilient portion, said second resilient portion, said third resilient portion, and said fourth resilient portion is a flexible material.

4. The pneumatic tire of claim 1, further comprising:
at least one of said first band and/or said second band having a plurality of tracks, said plurality of tracks traversing a length of said at least one of said first band and/or said second band.

5. The pneumatic tire of claim 4, further comprising:
said plurality of tracks of said at least one of said first band and/or said second band are oriented parallel to said recess of said rod.

6. The pneumatic tire of claim 1, further comprising:
a substance layer is located between at least a portion of said inner wall surface of said barrier element and at least a portion of said outer wall surface of said bladder.

7. The pneumatic tire of claim 6, further comprising: said substance layer having a low coefficient of friction.

8. The pneumatic tire of claim 1, further comprising:
a substance layer is located between at least a portion of said inner wall surface of said tire and said outer wall surface of said bladder.

9. The pneumatic tire of claim 8, further comprising: said substance layer having a low coefficient of friction.

10. A pneumatic tire having a leak resistance bladder, comprising:

a tire, said tire having an outer wall surface and an inner wall surface, said tire having a first sidewall and a second sidewall;

said first sidewall of said tire having a first resilient portion;

said second sidewall of said tire having a second resilient portion, said first resilient portion of said first sidewall of said tire is located parallel to said second resilient portion of said second sidewall of said tire, said first resilient portion of said first sidewall of said tire and said second resilient portion of said second sidewall of said tire are oriented on a substantially horizontal configuration, whereby, said first resilient portion of said first sidewall of said tire and said second resilient portion of said second sidewall of said tire are configured to compress along an x-axis when a force of an object is applied to said tire;

a tread portion, said tread portion is located on at least a portion of said outer wall surface of said tire;

a first bead having a first bead wire is connected to said first sidewall of said tire;

a second bead having a second bead wire is connected to said second sidewall of said tire, whereby, said first bead and said second bead are configured to connect to a rim;

a bladder, said bladder having a first sidewall located opposite a second sidewall, said first sidewall of said bladder having a first end and said second sidewall of said bladder having a second end, said bladder having an outer wall surface and an inner wall surface, at least a portion of said first sidewall of said bladder is connected to at least a portion of said first sidewall of said tire and/or at least a portion of said first bead, at least a portion of said second sidewall of said bladder is connected to at least a portion of said second sidewall of said tire and/or at least a portion of said second bead;

said first sidewall of said bladder having a third resilient portion;

said second sidewall of said bladder having a fourth resilient portion, said third resilient portion of said first sidewall of said bladder is located parallel to said fourth resilient portion of said second sidewall of said bladder, said third resilient portion of said first sidewall of said bladder and said fourth resilient portion of said second sidewall of said bladder are orientated on a substantially vertical configuration, whereby, said third resilient portion of said first sidewall of said bladder and said fourth resilient portion of said second sidewall of said bladder are configured to expand along a y-axis when the force of an object is applied to said tire, said bladder is configured to conform to a shape of the object that has been applied to said tire so that the object does not puncture said bladder;

a barrier element, said barrier element having an outer wall surface and inner wall surface, said barrier element is connected to at least a portion of said inner wall surface of said tire, and said barrier element, comprising:

a housing, said housing retaining an anchor tube structure, said anchor tube structure is connected to a first flexible protrusion, at least a portion of said first flexible protrusion extends into a compartment of said housing;

a first band, said first band having a first side with a first lip and a second side with a second lip, said first band is connected to at least a portion of said first flexible protrusion, whereby, at least a portion of said first band is retained within said compartment of said housing;

said anchor tube structure having a second flexible protrusion, at least a portion of said second flexible protrusion extends into a compartment of said housing;

said anchor tube structure having a third flexible protrusion, at least a portion of said third flexible protrusion extends into a compartment of said housing;

a second band, said second band having a first side with a first lip and a second side with a second lip, said second band is connected to at least a portion of said third flexible protrusion, whereby, at least a portion of said second band is retained within said compartment of said housing; and said first lip of said first band overlays said second lip of said second band.

11. The pneumatic tire of claim 10, further comprising:

at least one of said first band and/or said second band having a plurality of tracks, said plurality of tracks traversing a length of said at least one of said first band and/or said second band.

\* \* \* \* \*